3,146,277
SEPARATION OF OLEFINIC HYDROCARBONS BY MOLECULAR SIEVES

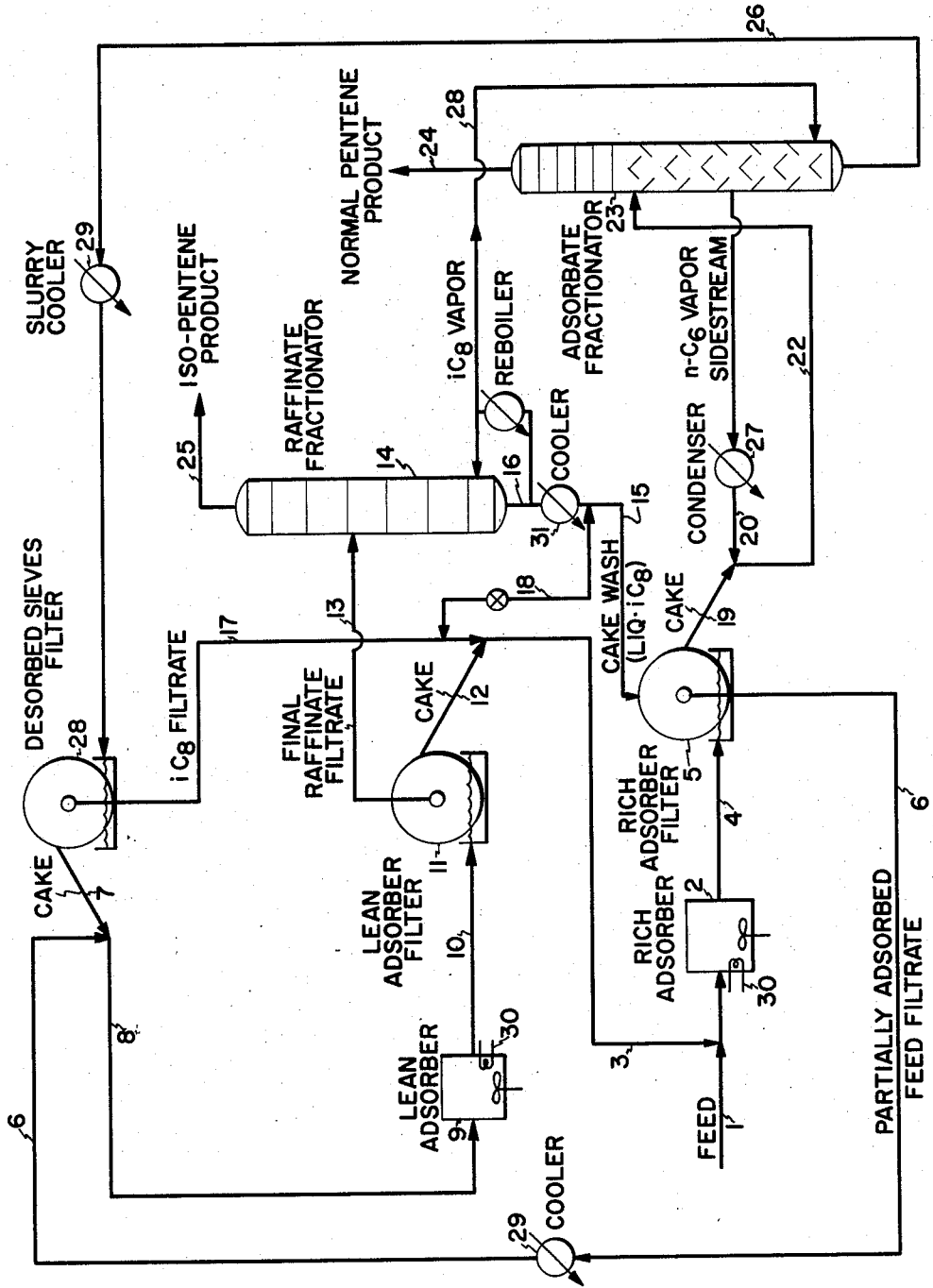

Truman Post Hawes and Clyde Lee Aldridge, Baton Rouge, La., and Lewis D. Etherington, Westfield, N.J., assignors to Esso Research and Engineering Company, a corporation of Delaware
Filed Mar. 8, 1961, Ser. No. 94,325
7 Claims. (Cl. 260—677)

The present invention relates to a process for separating olefins from hydrocarbon streams. More particularly, the present invention relates to the separation of straight chain olefinic hydrocarbons from straight chain, branched chain and cyclic hydrocarbons employing a class of natural or synthetic adsorbents, termed, because of their crystalline patterns with pore diameters of about 4.5 to 5.5 Angstrom units, molecular sieves. Still more particularly, the present invention relates to the separation of straight chain olefins from n-paraffins and recovery of these olefins in a substantially unisomerized state.

It has been known for some time that certain zeolites, both natural and synthetic, have the property of separating straight chain from branched chain hydrocarbon isomers, as well as from cyclic and aromatic compounds. These zeolites have innumerable pores of uniform size, and only molecules small enough to enter the pores can be adsorbed. The pores may vary in diameter from 3 to 4 Angstroms to 15 or more, but it is a property of these zeolites that any particular sieve has pores of substantially uniform size. For separating n-hydrocarbons from their isomers, a sieve is used in which the pore size is about 5 Angstroms.

The scientific and patent literature contains numerous references to the sorbing action of natural and synthetic zeolites. Among the natural zeolites having this sieve property may be mentioned chabasites. A synthetic zeolite with molecular sieve properties is described in U.S. 2,442,191. Zeolites vary somewhat in composition, but generally contain the elements of silicon, aluminum and oxygen as well as an alkali and/or an alkaline earth element, e.g., sodium and/or calcium. The naturally occurring zeolite analcite, for instance, has the empirical formula $NaAlSi_2O_6 \cdot H_2O$. Barrer (U.S. 2,306,610) taught that all or part of the sodium is replaceable by calcium to yield, on dehydration, a molecular sieve having the formula $(Ca, Na_2)Al_2Si_4O_{12}$. Black (U.S. 2,522,426) describes a synthetic molecular sieve zeolite having the formula $4CaO \cdot Al_2O_3 \cdot 4SiO_2$. The Linde 5A sieve, described in U.S. 2,882,244, is particularly effective in making these separations.

The segregation or removal of branched chain or straight chain isomers from hydrocarbon mixtures, either for the purpose of enriching the mixture in branched chain components or for isolating and recovering straight chain isomers has become increasingly important in industry with the growing realization that the activity, potency and desired physical property of a product may depend upon the specific structure of the various possible hydrocarbons utilizable as reactants in the preparation or manufacture of the final product. Thus, in the preparation of high octane fuels, the presence of paraffinic straight chain hydrocarbons makes for a lower octane fuel. On the other hand, in the manufacture of synthetic detergents such as the alkyl aryl sulfonates, a straight chain alkyl substituent confers better detergency characteristics than a branched chain isomer. Numerous other examples might be cited.

It has, in the past, been proposed to make separations of straight chain from branched chain, cyclic and aromatic hydrocarbons by molecular sieves, and excellent and highly selective separations have been realized. However, these separation techniques have proved to be ineffective when applied to streams including both straight chain paraffins and straight chain olefins. Though sieves have preferred adsorption characteristics for highly polar molecules over non-polar ones in mixtures, they will not separate efficiently n-olefins from a stream containing n-paraffins and n-olefins, particularly when the olefins have more than about 5 carbon atoms in the molecule. Consequently, the sieve, which has a pore size of about 5 Angstroms, will adsorb both the straight chain olefins and paraffins. Desorption of the zeolites will, therefore, produce a product consisting essentially of normal paraffins and normal olefins, still presenting a major separation problem.

Separation of single hydrocarbons from refinery streams of mixed composition becomes increasingly difficult as the number of carbon atoms per molecule increases. This is due to the increase in the number of isomers and the consequent decrease of boiling point differentials. For example, the lower molecular weight olefins can readily be obtained in high purity by fractionation from natural or manufactured raw streams. As the molecular weight enters the $C_5$ range, however, the exponential increase in the number of isomers makes large scale purification by fractionation difficult or impossible. Thus, pentene-1, a valuable straight chain alpha olefin is the principal component of certain refinery streams. It cannot readily be isolated by distillation due to the presence of other hydrocarbons in the same narrow boiling range. Since the interfering materials are branched, the separation of the original mixture into two parts, one containing the branched compounds and the other the straight chain compounds, would allow isolation of the desired 1-pentene by simple distillation.

As pointed out above, it has hitherto been suggested that molecular sieves be employed in separating branched chain from straight chain hydrocarbons, and these materials have been found highly effective for this purpose. However, when it was attempted to segregate and recover alpha olefins from plant streams by this method, it was found that a substantial proportion of the olefins recovered had been isomerized to olefins with double bonds closer to the center of the molecule. Furthermore, a portion of the product was found to have been polymerized.

It is therefore an important object of the present invention to set forth a method of separating normal alpha olefins from admixtures with other hydrocarbons, and particularly those of close boiling range, and of recovering these olefins without significant isomerization or polymerization.

It is a still further object of the present invention to provide a cyclic slurry process providing a purity and extent of olefin recovery not hitherto realizable.

It is a more specific object of the present invention to recover alpha olefins substantially unisomerized from refinery streams.

Other and further objects and advantages of the present invention will appear more clearly in the detailed description hereinafter.

It has now been found that these objects and advantages may be achieved by adsorbing an ddesorbing olefins with a slurry of molecular sieves under conditions which do not cause isomerization or polymerization to take place. In conventional fixed bed sieve operation, wherein pellets are employed, these latter normally contain a binder, such as clay, bentonite and the like to prevent mechanical distengration; the clays have substantial isomerization and polymerization activity. The sieve crystals are exceedingly fine, of the order of 5 microns, and cannot be adequately pelleted without the aid of the binder. Furthermore, the sieves, being zeolites, have substantial catalytic activity even in the absence of a binder. Attempts to desorb alpha olefins adsorbed on a fixed bed of sieves, even by the mildest of procedures, caused a shift of the double bond from the alpha to the more stable beta position so that 70 to 80% of the olefin, here pentene-1, was converted to and recovered as pentene-2.

Also, when sieve powder without binder was slurried in a non-adsorbent liquid, such as a branched chain hydrocarbon, and description of the alpha olefin was attempted, either by heat, vacuum, or displacement, again a product containing significant amount of $\beta$-olefins was recovered. Though the conversion was less than with the sieve pellets, nonetheless the isomerization activity of the zealite sieves was manifested. Thus a slurry sieve process per se also was found to be inadequate. Similar experiences were obtained when a sorbable slurry medium was employed.

In accordance with the present invention, excellent selectivity in olefin recovery is obtained by employing a molecular sieve slurried in a non-sorbable medium during the adsorption step and desorbing the olefins by a distillative desorption technique with a sorbable medium boiling between the higher boiling slurrying medium and the substance to be desorbed. In essence, in the adsorption cycle the olefinic stream is passed into the slurry of the sieve in a non-sorbable slurrying medium, such as a branched chain hydrocarbon. Thereafter, the sieve and adsorbed olefin are separated by filtration, centrifugation or other means known to the art, washed, and reslurried in a medium containing both a non-sorbable and a sorbable hydrocarbon and immediately subjected to a low temperature distillation process achieved by operating at reduced pressure. Though the intermediate boiling sorbable hydrocarbon has only moderate displacement action on the olefin adsorbed on the sieve, the immediate removal of the small amount of olefin by distillation and the recycle of the sorbable hydrocarbon medium drive the desorption to rapid completion, and reduce to a mimimum the contact time of the olefin with the sieve.

Thus it is an essential element of the present invention that the liquid medium in which the sieve powder is suspended is non-sorbable during the time the olefin is being adsorbed by the sieve, but that the medium consist in part of a sorbable component during the desorption stage of the process. Further, the non-sorbable liquid has a boiling point higher than that of any other component in the system, while that of the desorbing agent is intermediate between that of the non-sorbable slurry medium and that of the olefin.

The process is described as follows with the attached flow plan. The feed example is a mixture of iso- and normal-pentene. Iso-octane is used as the non-adsorbable slurry medium to dilute the feed, take up the adsorption heat (keep adsorption temperature down), and to convey the sieves through the process. Normal hexane, which is readily adsorbed, is used as the primary desorption agent to facilitate rapid displacement of n-pentene from the sieves. Normal-pentene is adsorbed selectively in preference to isopentene. Two countercurrent adsorber stages may be used.

The liquid feed mixture of iso- and normal-pentenes in line 1 enters the rich adsorber stage 2. Sieves from lean adsorber 9 suspended in iso-octane slurry medium also enter rich adsorber 2 via line 3. The sieves and feed liquid come to near equilibrium in adsorber 2, assisted by agitation, and the bulk of the feed n-pentene is adsorbed. The near-equilibrium slurry leaves vessel 2 via line 4 and is filtered in unit 5. The first feed filtrate from filter 5 contains the bulk of the feed i-pentene, the i-octane medium, some unadsorbed n-pentene, and leaves filter 5 in line 6. This filtrate picks up freshly desorbed sieves filter cake from sluice 7 of filter 28 and passes as a slurry in line 8 to agitated lean adsorber 9. The first feed filtrate comes to near-equilibrium with the sieves in adsorber 9 and substantially all the residual n-pentene is adsorbed. The near-equilibrium slurry leaves vessel 9 via line 10 and is filtrated in unit 11. The sieves cake from filter 11 in sluice 12, partially saturated with adsorbed n-pentene, is picked up with recycle i-octane from line 17, and the resultant slurry is sent countercurrently to rich adsorber 2 as mentioned previously. The final raffinate filtrate leaving filter 11 in line 13 contains substantially all the feed i-pentene, the recycle i-octane sorption medium, and only a trace of unadsorbed n-pentene. This filtrate is separated in raffinate fractionator 14. The isopentene product goes overhead and the i-octane fraction as bottoms. The adsorption conditions include temperatures up to about 100° F. above the boiling point of the olefin being adsorbed but preferably about 20° to 30° F. above the temperature of availalbe process cooling water. The pressures are from atmospheric to 10 atmospheres, preferably from 1 to 2 atmospheres for pentenes separation.

The sieves filter cake depositing on the screen of rich adsorber filter 5 contains substantially all the feed n-pentene in adsorbed form, but only a trace of adsorbed i-pentene. However, the initial filter cake does contain appreciable i-pentene in the occluded cake liquid. Thus, the cake is washed while still on the screen of filter 5 with a small quantity of i-octane from line 15 to remove the occluded isopentene-rich cake liquid, and thereby to provide a purer n-pentene product. The i-octane cake wash liquid is obtained as a liquid bottoms portion from raffinate fractionator 14 in line 16 and/or as filtrate from line 18 taken from line 17, to be described later. Iso-octane is the preferred cake wash liquid over n-hexane since it is poorly adsorbed and does not displace adsorbed n-pentene in any significant amount during the cake wash. The spent i-octane cake wash joins the first feed filtrate inside of filter 5 and goes to lean adsorber 9 in line 6 for re-adsorption of any small n-pentene quantity desorbed during cake wash. Alternatively, the spent i-octane cake wash in filter 5 may be segregated from the filtrate and added to adsorber 2 as slurrying medium via line 3. This alternative is preferred when cake wash efficiency is poor and a comparatively large quantity of wash liquid is required; i.e., the total recycle quantity of slurry medium is minimized by this procedure.

The washed n-pentene-rich cake in sluice 19 from filter 5 is picked up with n-hexane-rich hydrocarbon liquid from line 20 and the resultant slurry enters adsorbate fractionator 23. Hexane and i-octane vapor rising from the bottom of this tower strip n-pentene from the feed liquid-and-sieves slurry in efficient staged countercurrent fashion. Special tower staging such as discs-and-donuts are used below the feed point of tower 23 in order to avoid objectionable fouling of the stages with the powdered sieves. A vapor portion of the i-octane bottoms in line 28 from raffinate filtrate fractionator 14 is used to strip the slurry in fractionator 23. This use of bottoms product vapor from tower 14 to strip tower 23 slurry avoids the need of a slurry reboiler on tower 23 which would foul excessively with the powdered sieves. The desorption temperature is as low as possible in the vacuum system being used.

The stages above the feed plate of tower 23 do not contact the sieves and are of more conventional design such as bubble plates. The n-pentene product is taken overhead from tower 23 in line 24, substantially free of i-pentene, i-octane and n-hexane. The bottom section of tower 23 is used to strip n-hexane out of the recycle octane sorption medium. Otherwise, adsorbable n-hexane in the i-octane to the two adsorbers 2 and 9 would hurt sieves capacity for n-pentene. Hexane in the slurry feed to tower 23 is stripped, as previously stated, with recycle i-octane vapor to the bottom of tower 23, and the stripped hexane is removed from the tower as a vapor sidestream at an intermediate point below the feed in the stripping section where the tower vapor is substantially free of n-pentene. The vapor sidestream may be controlled as predominately hexane due to its high volatility relative to i-octane, but the sidestream will contain some i-octane. The hexane sidestream vapor is condensed in unit 27 and used to slurry the cake from filter 5 as previously mentioned. The quantity of the cake slurrying liquid in line 20 may be increased with i-octane by drawing off more tower 23 sidestream relative to bottoms, by adding tower 14 bottoms from line 16 or by adding i-octane filtrate from line 17.

The slurry of substantially i-octane and desorbed sieves leaving the bottom of tower 23 in line 26 is filtered in unit 28. The filtered sieves cake goes to the lean adsorber stage 9 as previously described. The i-octane filtrate is used primarily to dilute the feed as already mentioned.

A portion of the i-octane filtrate from filter 28 could be re-boiled and used as all or part of the stripping vapor for adsorbate fractionator 23. However, use of bottoms product vapor from tower 14 as tower 23 stripping vapor eliminates the need for the extra reboiler. Also, use of tower 14 bottoms as stripping vapor eliminates the need for filter 28 when only one adsorber stage is required; i.e., if lean adsorber stage 9 is not needed due to high sieves selectivity and capacity, tower 23 bottoms slurry could go directly to feed adsorber 2.

When the feed-sieves slurry does not foul heat exchanger surface excessively, adsorption heat may be removed indirectly from the adsorbers, such as by coils 30, rather than using unadsorbable feed diluent such as i-octane to soak up the heat. In this case, the quantity of iso-octane filtrate flowing in line 3 would be dictated by considerations of slurry viscosity, pumpability, etc., rather than adsorber temperature control. Thus, the i-octane would serve primarily for control of slurry concentration in the adsorbers, for filter cake wash, to displace n-hexane from the slurry in tower 23 (prevent adsorbable n-hexane from entering the adsorbers via the cake in sluice 7) and to carry the desorbed sieves back to the desorbers.

Many process modifications may be employed. For example, it is usually desirable to cool the hot recycle i-octane as slurry in line 26 or as filtrate in line 17. A temperature rise in rich adsorber 2 can be offset by first feed filtrate cooling in line 6. A portion of the desorbed n-pentene overhead from tower 23 can be used for filter cake wash in admixture with i-octane. Hot i-octane from line 16 may desirably be cooled prior to use as cake wash.

One or more reflux adsorber-filter stages (not shown) may be used if adsorbent selectivity is poor. For example, an additional countercurrent (reflux) stage may be fed with cake from filter 5 and with an n-pentene portion overhead from tower 23, diluted with i-octane. The raffinate from this stage combined with fresh feed would be fed to adsorber 2. The cake from the reflux stage would go to fractionator 23 via line 22. The said n-pentene portion diluted with i-octane may be used first as segregated cake wash for the reflux stage before being fed to the adsorber of this additional stage. For even greater efficiency, the said raffinate (filtrate) from this stage combined with fresh feed may be used as segregated cake wash on filter 5 before being fed to adsorber 2.

A moving bed of sieve pellets is an alternate technique of solids handling. The bed would move countercurrent to the feed in a first adsorber tower. Feed would enter at an intermediate point and i-octane at the bottom to displace occluded i-pentene liquid from the pellet void space and to take up adsorption heat. The mixture of isopentene and i-octane overhead from the adsorber tower would be fractionated and the i-octane fraction recycled to the bottom of the adsorber for re-use. The i-octane-wet solid leaving the bottom of the adsorber tower would be fed to the top of a separate desorber column. Normal hexane would be fed countercurrently at an intermediate point to desorb n-pentenes. Iso-octane would be fed countercurrently to the bottom of this tower. Overhead from the desorber would go to a fractionator for separation of an overhead n-pentene product fraction, a n-hexane sidestream fraction below the feed point, and an i-octane bottoms fraction. The hexane and octane fractions would be recycled to the desorber column, as all-vapor, all-liquid, or part liquid and vapor. The desorbed i-octane-wet solids would be lifted to the top of the adsorber. The adsorber and desorber columns could be combined as a single tower if desired.

The present invention may be further illustrated by the experimental results detailed below.

The advantages in conducting the desorption of olefin from sieves in the preferred manner will be obvious from comparison of the three examples of desorption which follow. They give data from experiments in which the desorption medium was respectively wholly sorbable, wholly non-sorbable, and sorbable in part.

EXAMPLE 1

Normal hexane was used as the single slurry medium. The desorption slurry consisted of 150 grams of sieve saturated with 1-pentene in 1 liter of hexane. Distillation at 35° C. (by operating at reduced pressure) and at 10/1 reflux ratios effected desorption to the extent shown below.

| Time, Hours | Pentene Recovered | |
|---|---|---|
| | Wt./100 Wt. Sieve (Cumulative) | Percent Isomerization in Successive Cuts |
| 0.8 | 1.5 | 0 |
| 1.6 | 2.8 | 0 |
| 3.2 | 5.3 | 3 |
| 4.1 | 6.7 | 24 |

EXAMPLE 2

Molecular sieve saturated with 1-pentene was subjected to desorption at 35° C. and at 10/1 reflux ratio from a medium composed only of iso-octane.

| Time, Hours | Pentene Recovered | |
|---|---|---|
| | Wt./100 Wt. Sieve (Cumulative) | Percent Isomerization in Successive Cuts |
| 1.1 | 2.5 | 37 |
| 2.2 | 3.3 | 43 |
| 3.2 | 3.6 | 44 |
| 4.3 | 3.9 | 40 |

EXAMPLE 3

In the preferred embodiment of the invention, the olefin saturated sieve was charged to a distillation flask along with a medium consisting of iso-octane (80%) and n-hexane (20%). The desorption was carried out at 35° and at 10/1 reflux ratio.

| Time, Hours | Pentene Recovered | |
|---|---|---|
| | Wt./100 Wt. Sieve (Cumulative) | Percent Isomerization in Successive Cuts |
| 0.4 | 2.5 | 0 |
| 0.8 | 4.3 | 0 |
| 1.6 | 7.0 | 4 |
| 2.5 | 8.4 | 4 |
| 3.4 | 9.3 | 6 |
| 4.3 | 9.9 | 9 |

The recovery shown, 9.9 wt./100 wt. sieve, represents 75 to 80% of the saturation value of 1-pentene in 5A sieve.

EXAMPLE 4

*Data on Fixed Bed Desorption Techniques Showing Degree of Isomerization*

In fixed bed experiments, desorption was carried out in either of two ways: (1) by flushing the sieve bed with nitrogen at 400° to 450° F. (200° to 230° C.), or (2) by introducing water into the nitrogen stream so that the partial pressure of water was low enough to hold it in the vapor phase. These water desorptions were done at 200° to 225° F. (93° to 107° C.). No difference in the desorbate composition was noted as a result of the two methods. A typical desorbate analysis from a plant feed is as follows:

| Component: | Weight percent |
|---|---|
| 1-pentene | 19.5 |
| Trans-2-pentene | 53.6 |
| Cis-2-pentene | 7.3 |
| 3-methyl-1-butene | 9.8 |
| Butane | 9.8 |

In the above example, 75.8% of the sorbed 1-pentene had been converted to the 2-pentene isomers. These data show that even under relatively mild desorption conditions, a substantial amount of isomerization occurs in fixed bed operation.

The process of the present invention is applicable to any case in which the recovery of an isomerizable straight chain hydrocarbon is required. Alpha olefins will readily isomerize to the beta isomer in contact with molecular sieves under certain conditions such as extended times of contact at atmospheric temperature, and much more rapidly at higher temperatures. The technique of this invention permits the use of molecular sieves for olefin recovery with minimized isomerization.

The normally gaseous olefins can be separated by distillation because, with fewer isomers, there are adequate differences in boiling points. However, when pentene-1, hexene-1, heptene-1, etc. are to be recovered, the process described here is the only one which will separate them with minimum isomerization.

The choice of slurry medium and displacing agent is very wide and is governed by these considerations:

*Slurry medium.*—(1) The boiling point must be higher than that of the displacing agent. (2) Because of molecular size and/or shape, it must not be sorbable by the molecular sieve.

*Displacing agent.*—(1) Its boiling point is preferably higher than that of the olefin to be recovered, and lower than that of the slurry medium. (2) It must be sorbable by the molecular sieve. (3) It is preferably a saturated hydrocarbon or non-polar material so that the force by which it is retained in the sieve is less than that between the sieve and the olefin. However, the displacing agent may be a straight chain olefin of lower boiling point than the feed olefin.

The above conditions are admirably exemplified by iso-octane as slurry medium, n-hexane as displacing agent, and 1-pentene as the sorbable feed olefin.

As to conditions, in both the adsorption of n-pentene and the replacement of pentene by hexane, the temperature should be as low as is consistent with practical process conditions in order to achieve minimum isomerization of the olefin. This is the reason for operating the displacement distillation at reduced pressure.

Though the example shows the recovery of pentenes, the invention is not restricted to this olefin, but is advantageously employed with olefins generally, particularly those having alpha unsaturation. The choice of reaction conditions, sorbable and non-sorbable displacement and slurrying agents is modified thereby.

EXAMPLE 5

*Example of Sorption of Pentene-1*

5 Angstrom molecular sieve substantially saturated with n-hexane was slurried in a blend of pentene-1 in iso-octane. Samples of the slurry liquid were withdrawn periodically for analysis to determine the hexane displacement by pentene on the sieves:

Conditions:
    Temperature—55° C.
    Pressure—Atmospheric.
Charge:
    17.27 gm. 5A sieve containing 2.19 gm. n-hexane.
    74.40 gm. iso-octane.
    7.27 gm. pentene-1.

| Time, Hours | On Sieve, W./100 W. | |
|---|---|---|
| | Hexane | Pentene |
| 0 | 12.7 | 0.0 |
| 0.25 | 9.0 | 4.0 |
| 0.50 | 6.4 | 6.4 |
| 1.0 | 4.3 | 8.4 |
| 2.0 | 3.4 | 9.3 |
| 3.0 | 3.0 | 9.7 |
| 4.0 | 2.8 | 10.0 |

As can be shown with these data, the sieves selectivity for n-pentene is over 1.1 relative to n-hexane. Thus, hexane is an ideal displacing agent. It gives efficient pentene-1 desorption, and is no more difficult to desorb with iso-octane than would be n-pentene.

What is claimed is:

1. An improved process for concentrating normal olefins from an olefinic stream and recovering said olefins in a substantial unisomerized condition which comprises slurrying a crystalline zeolitic molecular sieve having pore openings from about 4.5 to 5.5 Angstrom units in a non-sorbable medium having a boiling point higher than said olefin, passing said slurry into an adsorption zone, passing a stream comprising normal olefins into said zone, adsorbing said olefins on said sieve, separating said sieve containing adsorbed normal olefins from the bulk of said slurry medium, reslurrying said sieve in a medium comprising a non-adsorbable component and a sorbable hydrocarbon displacing agent, said sorbable hydrocarbon displacing agent having a boiling point intermediate said non-sorbable medium and said olefin, passing said slurry into a distillative desorption zone, subjecting said material to distillation at a sufficiently low temperature to avoid substantial isomerization and polymerization of said olefins, and recovering high yields of said first named normal olefin.

2. The process of claim 1 wherein said displacing agent is less polar than said olefin.

3. The process of claim 1 wherein the distillation desorption step is carried out at less than atmospheric pressures.

4. The process of claim 1 wherein the adsorption step is carried out at a temperature no higher than 100° F. above the boiling point of the olefin being adsorbed, and at a pressure of 1 to 10 atmospheres.

5. The process of claim 1 wherein the sieve plus adsorbed olefin is filtered from said non-sorbable slurry medium after the adsorption stage.

6. An improved process for concentrating a normal olefin stream without substantial isomerization which comprises contacting said stream with a 5 Angstrom molecular sieve zeolite slurried in a non-sorbable hydrocarbon liquid having a boiling point significantly higher than said olefin, adsorbing said olefins on said sieve, filtering said sieve plus adsorbed olefin from said higher boiling hydrocarbon, passing said sieve to a distillation desorption zone, slurrying said sieve with a slurrying medium comprising said non-sorbable hydrocarbon and a straight chain hydrocarbon of lower polarity and higher boiling point than said olefin but of lower boiling point than said non-sorbable medium, fractionally distilling said mixture at a sufficiently low temperature to avoid substantial isomerization and polymerization of said olefin, refluxing a stream comprising said less polar straight chain hydrocarbon, and recovering overhead an unisomerized olefin stream of high purity.

7. The process of claim 6 wherein said olefin feed comprises normal pentene-1, said non-sorbable suspending medium iso-octane, and said straight chain hydrocarbon of lower polarity n-hexane.

References Cited in the file of this patent

UNITED STATES PATENTS

| | | |
|---|---|---|
| 2,818,449 | Christensen et al. | Dec. 31, 1957 |
| 2,818,455 | Ballard et al. | Dec. 31, 1957 |
| 2,858,901 | Fort | Nov. 4, 1958 |
| 2,886,522 | Cooper et al. | May 12, 1959 |
| 2,906,795 | Ballard et al. | Sept. 29, 1959 |
| 2,914,591 | Brown | Nov. 24, 1959 |
| 2,957,927 | Broughton et al. | Oct. 25, 1960 |
| 3,086,627 | Sherwood | Dec. 18, 1962 |